United States Patent [19]

Patel

[11] Patent Number: 5,069,813
[45] Date of Patent: Dec. 3, 1991

[54] ELECTRICALLY CONTROLLED POLARIZATION-INDEPENDENT LIQUID CRYSTAL FRESNEL LENS

[75] Inventor: Jayantilal S. Patel, Red Bank, N.J.

[73] Assignee: Bell Communications Research, Inc., Livingston, N.J.

[21] Appl. No.: 626,205

[22] Filed: Dec. 10, 1990

[51] Int. Cl.$^5$ .................. C09K 19/52; C09K 19/56; G02F 1/13
[52] U.S. Cl. .................. 252/299.01; 252/299.4; 359/75; 359/94
[58] Field of Search .................. 252/299.01, 299.4; 350/340, 334, 347 V, 341

[56] References Cited

U.S. PATENT DOCUMENTS

| | | | |
|---|---|---|---|
| 4,037,929 | 7/1977 | Bricot et al. | 350/341 X |
| 4,190,330 | 2/1980 | Berreman | 350/330 |
| 4,904,063 | 2/1990 | Okada et al. | 350/347 V |
| 4,909,626 | 3/1990 | Purvis et al. | 356/332 |

*Primary Examiner*—Robert L. Stoll
*Assistant Examiner*—C. Harris
*Attorney, Agent, or Firm*—Leonard Charles Suchyta

[57] ABSTRACT

In successive zones of a layer of nematic liquid crystal material, the principal axes of at least some of the material in each zone are established orthogonal to the axes of at least some of the material in adjacent zones. By applying a uniform electric field to the zones of the entire layer, an electrically controlled polarization-independent Fresnel lens is achieved.

14 Claims, 3 Drawing Sheets

ELECTRICALLY CONTROLLED POLARIZATION-INDEPENDENT LIQUID CRYSTAL FRESNEL LENS

BACKGROUND OF THE INVENTION

This invention relates to liquid crystal materials and, more particularly, to Fresnel lenses that include such materials as constituents.

In a variety of optical information processing, interconnection and communication applications, it is advantageous to be able to focus light beams that are propagated between components. Thus, for example, in a system in which an array of lasers is provided, a corresponding array of lenses may be required to focus the individual beams emitted by the lasers, thereby to avoid deleterious beam dispersion effects. Fresnel lenses aligned with the outputs of such lasers constitute a convenient way of focusing their respective beams. An advantageous integrated assembly comprising a laser array with associated Fresnel microlenses formed on a single chip is described in a co-pending commonly assigned U.S. patent application of K. Rastani (Case 1), Ser. No. 612,924, filed Nov. 13, 1990.

Fresnel microlenses of the type described in the aforecited Rastani application are characterized by predetermined optical properties. The lenses in such as assembly are each designed to have an optimal diffraction efficiency at a particular wavelength. (In a batch-fabricated assembly, all the microlenses would typically be designed for the same wavelength). Once fabricated, such a lens exhibits fixed optical properties which would be less than ideal at other than the particular wavelength for which the lens was designed.

A Fresnel lens based on the use of liquid crystal materials has been suggested, as described by G. Williams et al in an article entitled "Electrically Controllable Liquid Crystal Fresnel Lens", SPIE, number 1168, pages 352-357, 1989. In the arrangement described by Williams et al, two identical Fresnel lenses are aligned in cascade such that the optic axis of one lens is orthogonal to that of the other. In that way, polarization-independent operation at a variable wavelength selected by varying an applied electrical bias voltage is reportedly achieved.

But unless the two constituent lenses of the Williams et al arrangement are exactly aligned with respect to each other, the focus achieved by the arrangement for an optical beam of one polarization will be spatially displaced along a given axis with respect to the focus achieved for an orthogonally polarized beam. Moreover, even if the constituent lenses are exactly aligned (which is particularly difficult to realize in the case of microlenses), the cascaded lenses of Williams et al will inherently form respective spaced-apart foci along an axis that is perpendicular to the given one. In practice, such polarization-dependent spatial variations in focus are undesirable.

Another disadvantage of the Williams et al design is that it includes patterned electrodes in the form of zones. Such an electrode pattern causes fringe electric fields, which are undesirable.

Accordingly, efforts have been directed at trying to develop electrically controlled polarization-independent Fresnel lenses that are relatively easy to fabricate, that do not exhibit spatial variation in focus for orthogonal polarizations and that do not exhibit fringe field problems. It was recognized that these efforts, if successful, would significantly contribute to the realization of high-performance optical systems of practical importance.

SUMMARY OF THE INVENTION

In accordance with the principles of the present invention, successive zones of a Fresnel lens are defined in a single layer of liquid crystal material. The principal optic axes of at least some of the material in adjacent zones are established orthogonal to each other, thereby to provide the basis for a polarization-independent lens characteristic. The difference in phase shift experienced by an optical beam in propagating through adjacent zones of the liquid crystal layer is changed by varying the voltage applied to a pair of continuous electrodes. In that way, the optical properties of the lens can be electrically controlled and optimized to achieve a given focus for a desired wavelength.

BRIEF DESCRIPTION OF THE DRAWING

A complete understanding of the present invention and of the above and other features thereof will be apparent from a consideration of the detailed description below taken in conjunction with the accompanying drawing, not drawn to scale, in which.

DETAILED DESCRIPTION

Figure 1:
FIGS. 1 through 5 are cross-sectional side-view representations that depict successive steps followed to fabricate a specific illustrative constituent of a Fresnel lens made in accordance with the principles of the present invention.

Fabrication of a specific illustrative Fresnel lens made in accordance with the principles of the present invention commences by forming a conventional transparent conductive layer 10 on the entire top surface of a transparent substrate 12, as indicated in FIG. 1. The layer 10 will form one of two continuous electrodes in the final device. By way of example, the layer 10 is made of indium tin oxide and is about 100 Angstrom units (Å) thick in the indicated Y direction.

Subsequently, a so-called alignment layer 14 is deposited on the entire top surface of the layer 10 shown in FIG. 1. The layer 14 comprises, for example, a conventional polymer of the type commonly used in the liquid crystal art for alignment purposes. When rubbed or otherwise suitably processed, the molecular configuration of the polymer is established in a specified orientation. In turn, that orientation will be imposed on the molecules of a subsequently introduced adjacent layer of liquid crystal material, as is well known in the art. The Y-direction thickness of the layer 14 is, for example, approximately 200-to-10,000 (Å).

Figure 2:
Figure 3:
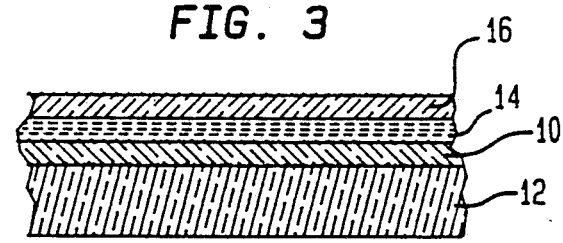

Illustratively, the alignment layer 14 is then rubbed in the X direction. As schematically indicated in FIG. 2 by multiple short horizontal lines in the layer 14, this causes the molecules of the polymer layer 14 to assume a substantially uniform X-direction orientation.

Next, a layer 16 of a conventional photoresist material is deposited on the entire top surface of the alignment layer 14. The layer 16, which, for example, is about one micrometer (μm) thick, is then patterned by standard photolithographic techniques to define the zones of a Fresnel lens. In later fabrication steps, corresponding zones will be thereby defined in an adjacent layer of liquid crystal material.

Emphasis herein will be directed to a specific illustrative Fresnel lens that comprises multiple concentric zones. In particular, the illustrative lens includes an innermost circular zone surrounded by successive adjacent ring-shaped zones. Such a configuration behaves like a spherical lens. In practice, multiple such zones (for example about at least ten-to-twelve zones) are required to achieve a lens that exhibits a satisfactory diffraction efficiency. Herein, so as not to unduly clutter the drawing, only some of these zones will be explicitly depicted.

Figure 4:
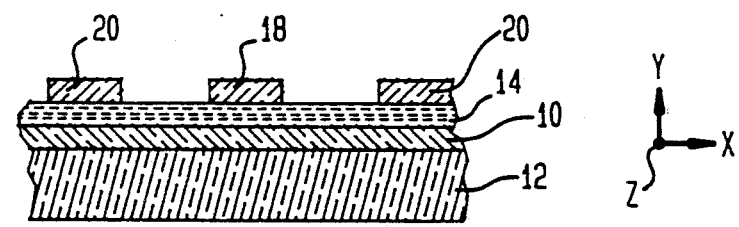

In FIG. 4, circular portion 18 of the photoresist pattern defines in effect the innermost circular zone of the aforespecified Fresnel lens. Similarly, ring-shaped portion 20 of the photoresist pattern and the ring-shaped gap between the portions 18 and 20 define the first two ring-shaped zones that will surround the innermost circular zone of the Fresnel lens.

In accordance with the invention, the X-direction-aligned layer 14 with the aforedescribed photoresist pattern thereon is then further processed to change the molecular orientation of the layer 14 in those regions that are not covered with photoresist material. This is done, for example, by rubbing the structure shown in FIG. 4 in the indicated Z direction. Such rubbing causes the structure in the uncovered portions of the layer 14 to become oriented in the Z direction, as indicated by dots in the layer 14 shown in FIG. 5. The X-direction orientation of the molecules in the photoresist-covered regions of the layer 14 remains unchanged.

Figure 5:
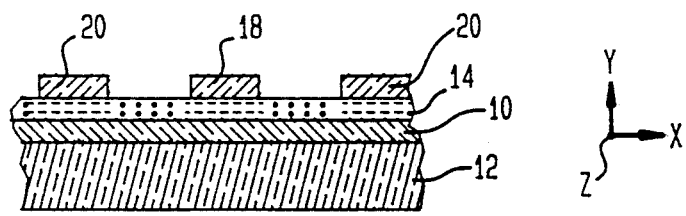
Figure 6:
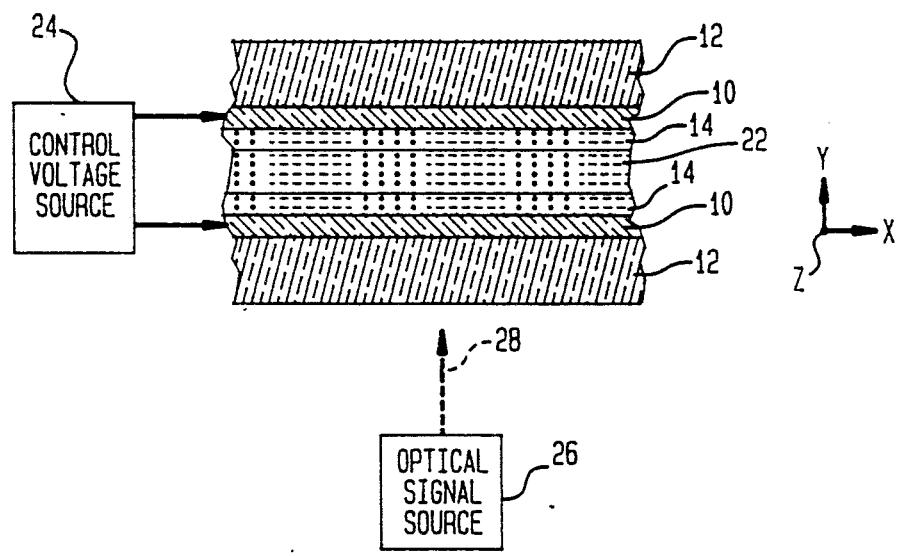
FIG. 6 shows two constituents of the type illustrated in FIG. 5 assembled to form one embodiment of the invention.
Figure 7:
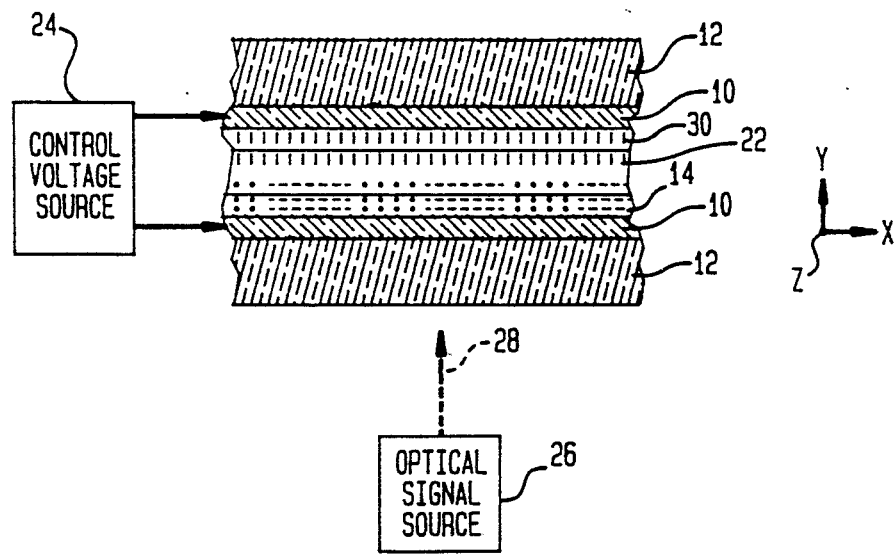
FIG. 7 shows a FIG. 5-type constituent combined with a modified version thereof to form another embodiment of the invention.

Subsequently, the photoresist pattern shown in FIG. 5 is removed. The resulting structure constitutes a basic constituent from which Fresnel lenses made in accordance with the present invention are fabricated. A portion of one form of lens constituting two identical such basic constituents is represented in FIG. 6. Another alternative lens arrangement also embodying the principles of the invention is shown in FIG. 7. The FIG. 7 arrangement includes the aforespecified basic constituent combined with a modified version thereof.

As mentioned above, FIG. 6 represents a portion of a Fresnel lens that includes two identical FIG. 5 constituents (each with the photoresist pattern removed). Corresponding elements of each of these two identical constituents are identified in FIG. 6 with the same reference numerals employed therefor in FIG. 5. Thus, the upper constituent of FIG. 6 includes a glass substrate 12, a conductive transparent layer 10 and an alignment layer 14. The lower constituent includes identical elements bearing the same respective reference numerals. Importantly, the upper and lower constituents should be exactly or substantially exactly aligned such that corresponding molecular orientations established in the alignment layers 14 overlap each other. The glass substrates 12 constitute the outer walls of the depicted lens.

Interposed between the alignment layers 14 of FIG. 6 is a layer 22 of a liquid crystal material. The layer 22 is retained in the space between the layers 14 by conventional peripheral seals (not shown). Also, the uniformity of the thickness of the layer 22 is typically ensured by utilizing standard spacer elements (not shown) in contact with the layers 14. Illustratively, the Y-direction thickness of the layer 22 is about 2-to-100 μm. Advantageously, the layer 22 comprises a conventional nematic liquid crystal material. The molecules of such a material may be regarded as elongated rod-like molecules, disc-like molecules or plate-like molecules each having a principal longitudinal axis.

As is well known, most liquid crystals are uniaxial anisotropic materials in which the refractive index can be modified significantly by applying relatively low voltages thereto (for example, voltages in the range of about 2-to-100 volts for a nematic liquid crystal material having a thickness of approximately 2-to-100 μm). The magnitude of the electrically induced change in refractive index depends on the orientation of molecules in the liquid crystal material and on the polarization of light directed at the material. Imposition of an electric field across a layer of such material tends to align the principal axes of the molecules thereof parallel to the electric field lines for materials with a positive dielectric anisotrophy.

Significantly, due to the aforespecified molecular orientations established in the alignment layers 14, the molecules in the bulk of the liquid crystal material in the layer 22 shown in FIG. 6 are influenced to assume corresponding orientations. Thus, as schematically indicated in FIG. 6, the aforespecified zones defined in the alignment layers 14 are also established in the liquid crystal layer 22. Importantly, the principal axes of the molecules of the liquid crystal material in each such zone are oriented orthogonal to the principal axes of the liquid crystal molecules in adjacent zones. Overall, the zones function as a planar binary-phase Fresnel lens.

A control voltage source 24 shown in FIG. 6 is connected to the electrode layers 10 for applying a Y-direction electric field to the depicted structure. Further, an optical signal source 26 is positioned to direct a light beam at the structure parallel to the indicated Y axis, as represented by dash-line arrow 28. The polarization of any randomly polarized beam such as the beam 28 may be represented as constituting linear polarization components respectively parallel to the X and Z axes.

In a planar binary-phase Fresnel lens of the type considered herein, the phase difference $\Delta\phi$ experienced by portions of a given beam respectively propagating through adjacent zones is given by the expression $$\Delta\phi = \frac{2\pi \Delta n d}{\lambda} \quad (1)$$

where $\Delta n$ is the absolute value of the difference between the respective indices of refraction in adjacent zones, d is the Y-direction thickness of the liquid crystal layer 22 of FIG. 6 and $\lambda$ is the wavelength of the propagating light. Maximum diffraction of an incident light beam into a specified focal plane occurs when the phase difference $\Delta\phi$ between adjacent zones of one of the herein-described Fresnel lenses is an odd multiple of $\pi$. No diffraction occurs for even multiples of $\pi$.

In the absence of a control voltage applied to the electrodes 10 of the FIG. 6 lens, the molecular orientations of the liquid crystal material in adjacent zones of the layer 22 are as depicted in FIG. 6. For the X-direction polarization component of an optical signal supplied to the lens by the source 26, the liquid crystal zones having the principal axes of their molecules aligned parallel to the X axis will exhibit a relatively high index of refraction of a first particular value, whereas the adjacent zones having orthogonal molecular alignments (in the Z direction) will exhibit a relatively low index of refraction of a second particular value. For the Z-direction polarization component, the values of the indices of refraction in adjacent zones are respectively reversed. For each polarization component, the absolute value of $\Delta n$ between adjacent zones is the same.

Without an applied voltage from the source 24 (FIG. 6) and for a beam having a particular wavelength $\lambda$, the thickness d of the liquid crystal layer 22 may, for example, be selected such that the phase difference $\Delta\phi$ in adjacent zones for each polarization is an odd multiple of $\pi$. Under these conditions, focusing of the beam in a specified focal plane will occur. Alternatively, the thickness of the layer 22 may be selected such that the conditions for focusing are not satisfied for the particular wavelength when no Y-direction electric field is present in the layer 22. In this latter case, the conditions for focusing can be established by changing the wavelength of the beam to make $\Delta\phi$ equal to an odd multiple of $\pi$. Or, based on the phenomena described in the next two paragraphs set forth below, focusing of the particular wavelength can be achieved by applying a Y-direction electric field to change the index difference $\Delta n$ between adjacent zones to make the phase difference $\Delta\phi$ equal to an odd multiple of $\pi$.

Application of a Y-direction electric field to the FIG. 6 structure causes each of the X-direction-aligned liquid crystal molecules in the layer 22 to rotate in a plane that is parallel to the indicated X-Y plane. In turn, for X-direction-polarized light, this causes a decrease in the index of refraction of the liquid crystal material in the zones made up of those rotated molecules.

The applied Y-direction electric field is also effective to rotate the Z-direction-aligned liquid crystal molecules in the layer 22 of FIG. 6. Such rotation of each molecule occurs in a plane that is parallel to the indicated Y-Z plane. But, for X-direction-polarized light, the index of refraction of the liquid crystal material in the zones made up of those rotated molecules remains unchanged from what it was in the absence of an applied field. This lack of change combined with the aforedescribed decrease in index in adjacent zones constitutes the mechanism by which $\Delta n$ can be varied by an applied electric field to change $\Delta\phi$ to a value that satisfies the condition for focusing.

For Z-direction-polarized light, the aforedescribed index changes caused in adjacent zones of the layer 22 of FIG. 6 by an applied Y-direction electric field are respectively reversed. Thus, the focusing action achieved by the depicted electrically controlled structure is independent of the polarization of the light propagated therethrough.

An electrically controlled polarization-independent Fresnel lens that is a modified version of the above-described FIG. 6 structure is shown in FIG. 7. FIG. 7 comprises two constituents. Illustratively, the lower constituent in FIG. 7 is identical to each of the two basic constituents shown in FIG. 6. The elements in this lower constituent are respectively designated with the same reference numerals employed therefore in FIG. 6. In FIG. 7, the elements of the lower constituent comprise a glass substrate 12, an electrode layer 10 and an alignment layer 14. As shown, the molecules of the material in the alignment layer 14 of FIG. 7 have been oriented in the indicated X and Z directions.

The upper constituent of the lens arrangement of FIG. 7 also includes a glass substrate 12 and an electrode layer 10. Additionally, an alignment layer 30 is deposited on the entire bottom surface of the upper electrode layer 10. But, as indicated by short lines in the layer 30 parallel to the Y axis, the molecular orientation in the layer 30 is designed to be everywhere the same and respectively orthogonal to the molecular orientations in the lower alignment layer 14.

A variety of materials suitable for alignment purposes in liquid crystal devices are known which, as deposited, assume the molecular orientation represented in the layer 30 of FIG. 7. An advantageous material that exhibits such a homeotropic alignment characteristic (molecules oriented perpendicular to the surface of the material) is a standard material known as n-octadecyltriethoxysilane or n-octadecyltrimethoxysilane made by Petrach Systems of Bristol, PA.

The depicted FIG. 7 lens also includes a control voltage source 24 and an optical signal source 26. Further, a layer 22 of liquid crystal material is contained between the alignment layers 14 and 30.

The principal axes of liquid crystal molecules at the bottom of the layer 22 of FIG. 7 are influenced by the molecular orientation established in the lower alignment layer 14 to assume a corresponding orientation, as represented in the layer 22 by dots and short X-aligned lines. Similarly, liquid crystal molecules at the top of the layer 22 of FIG. 7 are influenced by the molecular orientation established in the upper alignment layer 30 to assume a homeotropic orientation corresponding to that in the layer 30, as indicated in the layer 22 by short Y-aligned lines. Through the bulk of the layer 22 in the Y-direction, the contour of the principal axes of the molecules of the liquid crystal material gradually changes from an X- or Z-aligned direction at the bottom of the layer 22 to a Y-aligned direction at the top thereof. As a consequence, the principal axes of at least some of the liquid crystal material in adjacent zones are orthogonal to each other. For the same basic reasons described earlier above, such orthogonality is the basis for polarization-independent operation of the depicted lens.

An advantage of the FIG. 7 lens relative to the FIG. 6 one is that a precise alignment between the two constituents of FIG. 7 is not necessary. This stems from the fact that the molecular orientation in the upper alignment layer 30 is everywhere the same. On the other hand, for a given thickness d of the liquid crystal layer 22, the electrically turnable range of $\Delta\phi$ of the FIG. 7 lens is only about one-half that of the FIG. 6 structure. At the expense of decreasing the speed at which $\Delta\phi$ can be electrically varied, the range of $\Delta\phi$ of the FIG. 7 lens can be increased by increasing the thickness d of the layer 22 thereof.

Figure 8:
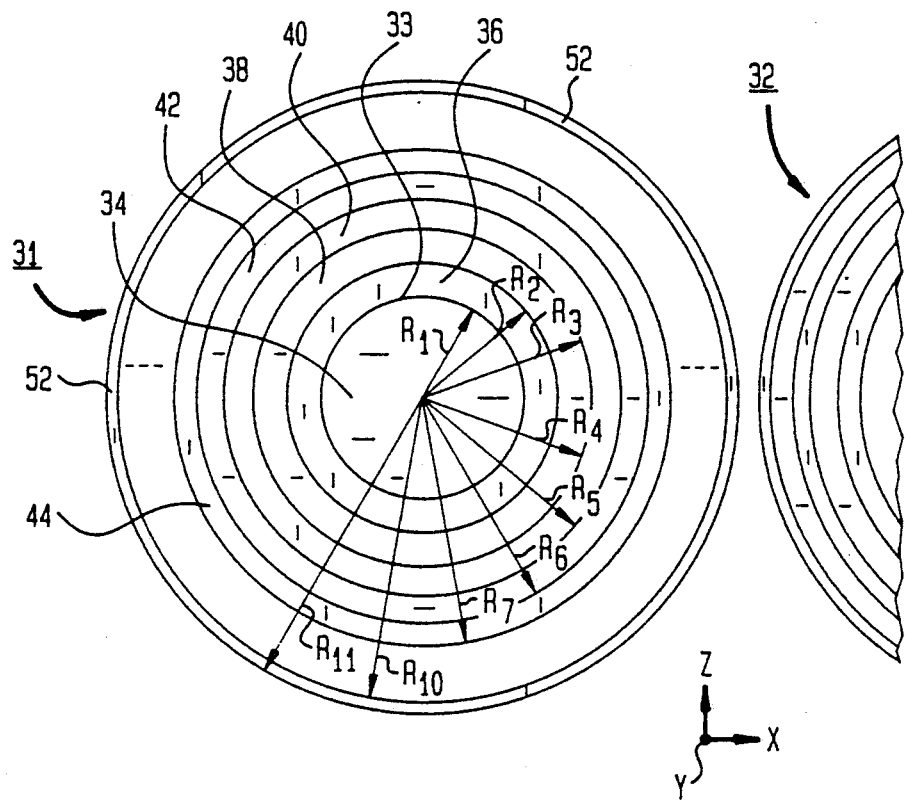
FIG. 8 is a simplified bottom-view schematic representation of the specific illustrative embodiment shown in FIG. 6.

FIG. 8 represents a portion of a binary-phase Fresnel lens 31 made in accordance with the principles of the present invention. By way of example, FIG. 8 schematically depicts the configuration of the liquid crystal layer 22 of FIG. 6 as viewed from the bottom thereof. Further, FIG. 8 also shows a portion of another such lens 32, thereby to illustrate that, in some applications of practical importance, it is advantageous to fabricate an array of such lenses. Illustratively, such an array of lenses can be batch-fabricated in microminiature form by techniques of the type specified herein to form an integrated assembly.

The solid-line circles shown in FIG. 8 are included only for conceptual purposes. These circles denote the boundaries between adjacent orthogonally oriented zones of the liquid crystal layer 22. Thus, for example, line 33 marks the boundary between circular zone 34 and an adjacent ring-shaped zone 36.

As indicated in FIG. 8 by short lines parallel to either the X or Z axis, the orientations of the principal axes of the liquid crystal molecules in adjacent zones are orthogonal to each other. Only seven such zones 34, 36, 38, 40, 42, 44 . . . 52 are explicitly shown in FIG. 8.

In a binary-phase Fresnel lens of the type described herein, the radius of the $m^{th}$ zone ($R_m$) is given by the expression $$R_m^2 = mR_1^2 \quad (2)$$

where $R_1$ is the radius of the innermost zone (such as the circular zone 34 shown in FIG. 8). The relationship between the focal length f of such lens and $R_1$ is $$f = \frac{R_1^2}{\lambda} \quad (3)$$

where $\lambda$ is the wavelength of the incident beam.

In one specific illustrative embodiment of the principles of the present invention wherein f=31 centimeters and $\lambda = 0.514$ μm, $R_1$ is determined from expression (3) to be equal to 0.399 millimeters (mm). Similarly, $R_2$ is calculated from expression (2) to be equal to 0.565 mm. Hence, the width of the ring-shaped zone 36 shown in FIG. 8 is designed to be 0.166 mm. The widths of the other zones 38, 40, 42, 44 . . . 52 can be determined easily in a similar fashion.

Finally, it is to be understood that the various specific arrangements and techniques described herein are only illustrative of the application of the principles of the present invention. In accordance with these principles, numerous alternatives and modifications may be made by those skilled in the art without departing from the spirit and scope of the invention. For example, although emphasis above has been directed to concentric zones defined in a layer of liquid crystal material to form a spherical lens, it is apparent that the principles of the present invention are also clearly applicable to the establishment in such a layer of other types of lenses. Thus, for example, by establishing therein plural parallel straight zones in which the principal axes of at least some of the molecules of the liquid crystal material are orthogonal with respect to at least some of the axes in adjacent zones, there is thereby formed a cylindrical lens that can provide a line-shaped focus. Additionally, other force fields such as a magnetic field may be employed to change the orientation of the molecules in the liquid crystal material.

Figure 9:
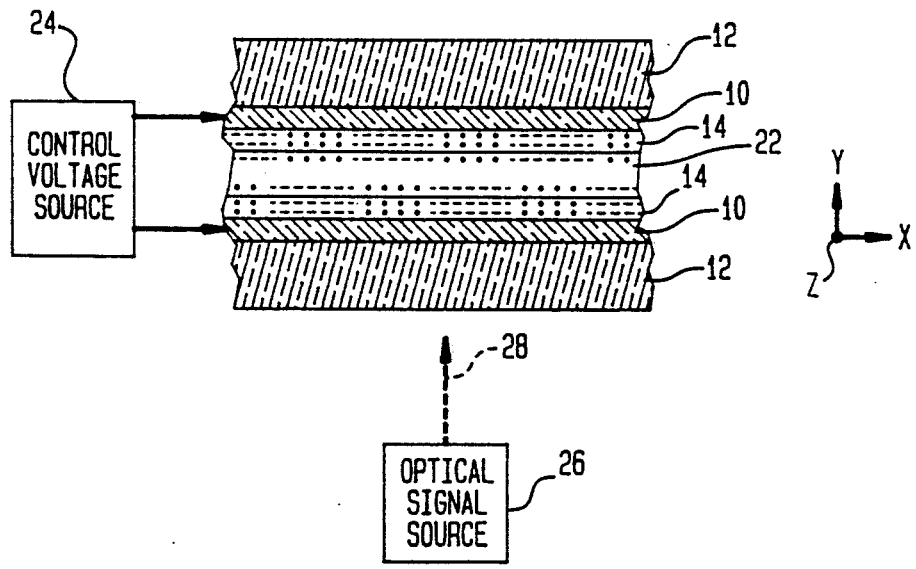
FIG. 9 shows yet another embodiment of the principles of the present invention.

Further, it is apparent that variations of the particular illustrative lens structures shown in FIGS. 6 and 7 are feasible. One such specific variation is shown in FIG. 9 wherein two constituents of the FIG. 5 type are combined to form a Fresnel lens. But, as indicated in FIG. 9, the upper and lower constituents of the lens are purposely offset with respect to each other. In particular, the constituents are offset such that X-direction-aligned molecules in the upper alignment layer 14 of FIG. 9 overlie Z-direction-aligned molecules in the lower alignment layer 14, and vice versa. Such an alignment of the two constituents may be regarded as being complementary to the alignment shown in FIG. 6. Thus, in FIG. 9, the molecular orientation of each liquid crystal molecule at the top of the liquid crystal layer 22 is everywhere displaced by 90 degrees relative to the molecular orientation of a correspondingly located underlying liquid crystal molecule at the bottom of the layer 22.

What is claimed is:

1. An assembly comprising a layer of liquid crystal material having liquid crystalline molecules each of which has a principal axis, said layer having two main spaced-apart parallel planar surfaces, means for quiescently establishing in said layer of liquid crystal material, in the absence of an applied field, plural successive zones in which the principal axes of at least some of the liquid crystalline molecules in each zone of said layer are parallel to said surfaces and orthogonal with respect to the principal axes of at least some of the liquid crystalline molecules in adjacent zones thereby to define the zones of a binary-phase Fresnel lens, and means for establishing a uniform field in said layer of liquid crystal material to change the orientation of the principal axes of at least some of the molecules in each of said zones.

2. An assembly as in claim 1 wherein said second-mentioned means for establishing comprises continuous unpatterned planar electrodes respectively disposed parallel to the respective surfaces of said layer for establishing throughout the entirety of said layer a uniform electric field whose field lines are orthogonal to said surfaces.

3. An assembly as in claim 1 wherein said first-mentioned means for establishing comprises alignment layers respectively disposed between said electrodes and the surfaces of said liquid crystal layer.

4. An assembly as in claim 3 wherein said alignment layers are structurally the same.

5. An assembly as in claim 4 wherein each of said alignment layers causes the principal axes of the molecules in each zone of said liquid crystal layer to be parallel to said planar surfaces and orthogonal with respect to the principal axes of the molecules in adjacent zones.

6. An assembly as in claim 3 wherein said alignment layers are dissimilar.

7. An assembly as in claim 6 wherein one of said alignment layers causes the principal axes of the molecules in an adjacent surface region of each zone of said liquid crystal layer to be parallel to said planar surfaces and orthogonal with respect to the principal axes of the molecules in adjacent surface regions of adjacent zones, and wherein the other one of said alignment layers causes the principal axes of the molecules in an adjacent surface region of each zone to be orthogonal with respect to said planar surfaces.

8. An assembly as in claim 3 wherein said plural successive zones comprise a central circular zone and successive ring-shaped zones surrounding said circular zone.

9. An assembly as in claim 8 wherein said liquid crystal layer comprises a nematic liquid crystal material.

10. An assembly as in claim 9 further including a control voltage source connected to said electrodes.

11. An assembly as in claim 10 further including an optical signal source for directing randomly polarized light at one of said planar surfaces.

12. An assembly as in claim 3 wherein said binary-phase Fresnel lens is combined with at least one other such lens to form an integrated planar array.

13. An assembly as in claim 5 wherein said alignment layers are aligned with respect to each other such that the principal axes of the molecules in each zone of said liquid crystal layer are caused to be everywhere approximately parallel to each other and oriented in the same direction.

14. An assembly as in claim 5 wherein said alignment layers are aligned with respect to each other such that the principal axes of the molecules in each zone of said liquid crystal layer are caused to be everywhere approximately parallel to each other but wherein the principal axes of liquid crystal molecules adjacent one of said alignment layers in each zone are caused to be oriented orthogonal to the principal axes of liquid crystal molecules adjacent the other one of said alignment layers in the same zone.

* * * * *